United States Patent
Seitz

(10) Patent No.: US 9,856,006 B2
(45) Date of Patent: Jan. 2, 2018

(54) METHOD, APPARATUS AND SYSTEM FOR REDUCING VIBRATION IN A ROTARY SYSTEM OF A WATERCRAFT

(75) Inventor: Norbert Seitz, Gröbenzell (DE)

(73) Assignee: Bertil Carnehammar, Zurich (CH)

( * ) Notice: Subject to any disclaimer, the term of this patent is extended or adjusted under 35 U.S.C. 154(b) by 215 days.

(21) Appl. No.: 13/501,577

(22) PCT Filed: Nov. 17, 2010

(86) PCT No.: PCT/EP2010/067687
§ 371 (c)(1),
(2), (4) Date: Jun. 21, 2012

(87) PCT Pub. No.: WO2011/061228
PCT Pub. Date: May 26, 2011

(65) Prior Publication Data
US 2012/0252591 A1    Oct. 4, 2012

(30) Foreign Application Priority Data

Nov. 20, 2009  (EP) .................................... 09176604

(51) Int. Cl.
*B63H 21/30*    (2006.01)
*F16F 15/36*    (2006.01)

(52) U.S. Cl.
CPC ......... *B63H 21/302* (2013.01); *F16F 15/366* (2013.01); *Y10T 29/4998* (2015.01); *Y10T 464/50* (2015.01)

(58) Field of Classification Search
CPC ..... B63H 21/302; F16F 15/366; Y10T 464/50
USPC ......... 464/180; 416/144, 145, 500; 188/268, 188/269, 322.5; 74/573.1; 73/468; 29/407.07, 527.1, 901
See application file for complete search history.

(56) References Cited

U.S. PATENT DOCUMENTS

| | | | |
|---|---|---|---|
| 4,712,663 A * | 12/1987 | Teraoka | |
| 4,867,792 A   | 9/1989  | Ronlan | |
| 5,195,930 A * | 3/1993  | Hirano et al. | 464/180 |
| 5,425,675 A * | 6/1995  | Pfeifer | 464/180 X |
| 5,431,726 A * | 7/1995  | Ronlan | |

(Continued)

FOREIGN PATENT DOCUMENTS

| | | |
|---|---|---|
| EP | 0 010 973 A1 | 5/1980 |
| EP | 0 281 252 A1 | 2/1988 |

(Continued)

OTHER PUBLICATIONS

Notice of Final Rejection issued by the Korean Intellectual Property Office on Aug. 4, 2017, in Korean Patent Application No. 10-2012-7010509, which is the Korean counterpart of this application.

*Primary Examiner* — Josh Skroupa
(74) *Attorney, Agent, or Firm* — Robert Lelkes

(57) ABSTRACT

A method of reducing vibration in a rotary system (120, 130, 140) of a watercraft, for example a cargo ship (100), comprising balancing said rotary system (120, 130, 140), characterized by providing a rotational element (300, 302-306) comprising a chamber (310-312) having a fulcrum on a rotational axis (340) of said rotational element (300, 302-306), comprising a circumferential balancing area (320) and being partially filled with an amount of a thixotropic balancing substance (330). A corresponding apparatus and system.

18 Claims, 7 Drawing Sheets

(56) References Cited

U.S. PATENT DOCUMENTS 6,254,488 B1 *   7/2001   Hill ............................... 464/180
2007/0137955 A1 *   6/2007   Maranville ............. F16F 9/535
                                                   188/267.2

FOREIGN PATENT DOCUMENTS

| EP | 1 666 763 A1 | 6/2006 |
|----|--------------|--------|
| JP | 2003343539 A | 12/2003 |
| KR | 20020077979 A | 10/2002 |
| WO | WO 2008009696 * | 1/2008 |
| WO | WO 2009037314 * | 3/2009 |
| WO | WO 2010/003988 A1 | 1/2010 |

* cited by examiner

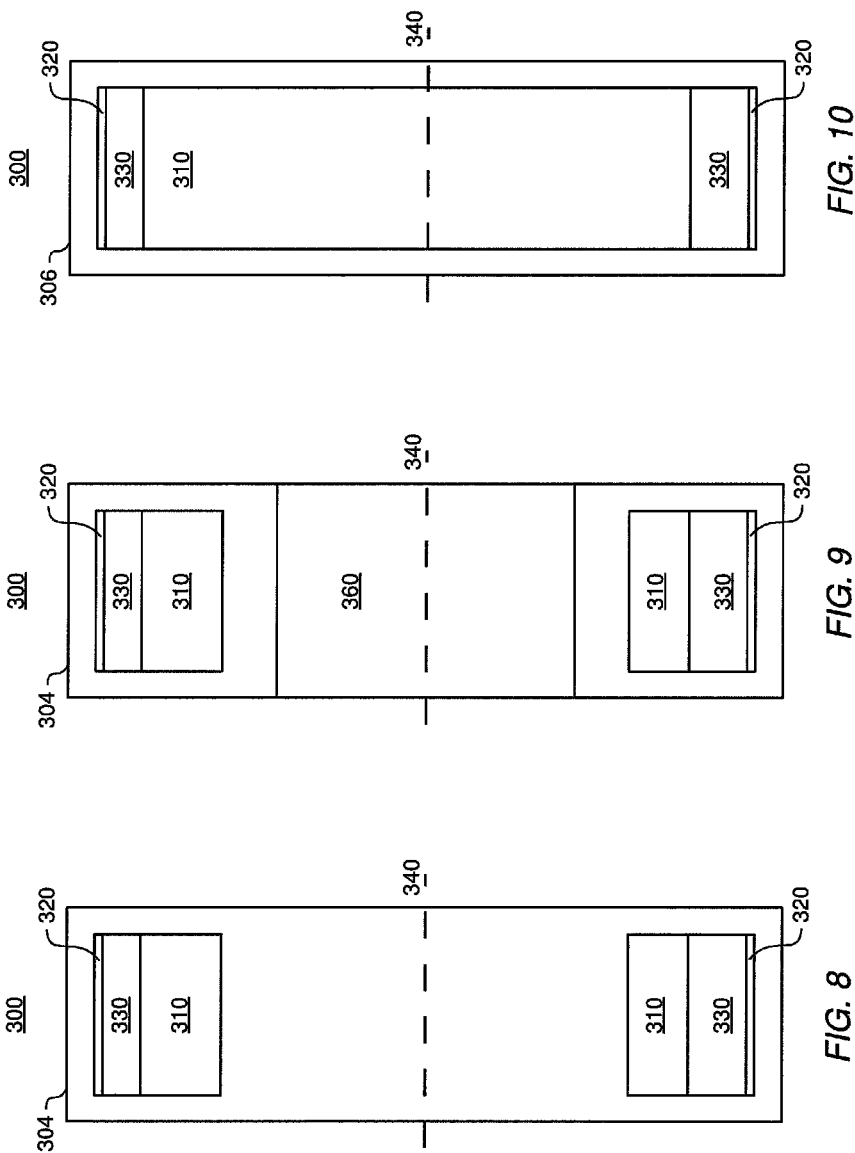

ical propulsion system, such as an engine or motor system, a power transmission system, or propeller, of a watercraft, for example a vessel, such as a boat or ship.

METHOD, APPARATUS AND SYSTEM FOR REDUCING VIBRATION IN A ROTARY SYSTEM OF A WATERCRAFT

CROSS REFERENCE TO RELATED APPLICATIONS

This application claims the benefit and priority to and is a U.S. National Phase Application of PCT International Application Number PCT/EP2010/067687, filed on Nov. 17, 2010, designating the United States of America and published in the English language, which is an International Application of and claims the benefit of priority to European Patent Application No. 09176604.8, filed on Nov. 20, 2009. The disclosures of the above-referenced applications are hereby expressly incorporated by reference in their entireties.

FIELD OF THE INVENTION

Embodiments of the invention described herein relate generally to reducing vibration, and more particularly to a method, an apparatus and a system for reducing vibration in a rotary system of a watercraft, for example a mechanical propulsion system, such as an engine or motor system, a power transmission system, or propeller, of a watercraft, for example a vessel, such as a boat or ship.

BACKGROUND OF THE INVENTION

Vibration is a major environmental factor in watercraft. Vibration negatively effects safety and comfort. With regard to safety, vibration has a direct influence on stability and may cause material fatigue and damage. A main source of vibration is a rotary system of the watercraft, for example a mechanical propulsion system, such as an engine or motor system or a power transmission system, of the watercraft. Vibrations may comprise rotation-speed-dependent vibrations generally originating from the engine or motor system and speed-dependent vibrations generally originating from the power transmission system. Vibrations may damage rolling-element bearings, for example ball bearings or roller bearings, used, for example, as engine bearings, or seals.

Owing to wear and tear of the engine or motor system and power transmission system, vibration in the watercraft generally increases over time. In more detail, owing to wear and tear of a rotating element, it's center of gravity (CofG) moves over time causing an imbalance causing vibration.

For these and other reasons, there is a need for the invention as set forth in the following in the embodiments.

SUMMARY OF THE INVENTION

The invention aims to provide a method, an apparatus and a system for reducing vibration in a rotary system of a watercraft, for example a mechanical propulsion system, such as an engine or motor system, a power transmission system or propeller, of a watercraft, for example a vessel, such as a boat or ship.

An aspect of the invention is a method of reducing vibration in a rotary system 120, 130, 140 of a watercraft, for example a cargo ship 100, comprising balancing said rotary system 120, 130, 140, characterized by providing a rotational element 300, 302, 304, 306 comprising a chamber 310-312 having a fulcrum on a rotational axis 340 of said rotational element 300, 302, 304, 306, comprising a circumferential balancing area 320 and being partially filled with an amount of a thixotropic balancing substance 330.

The rotary system 120, 130, 140 may be an engine, a powertrain or powerplant, or a propeller of the watercraft. The thixotropic balancing substance 330 is able to flow under the influence of the vibration induced by the rotary system 120, 130, 140. Hence, owing to the vibration, the thixotropic balancing substance 330 distributes itself in the chamber 310 to reduce or minimize the vibration. As a consequence, a center of gravity (CofG) 350 or center of rotation (CofR) of the rotary system 120, 130, 140 moves towards an ideal CofR 350, and the method compensates for migration of the CofG. As a further consequence, vibration is reduced, and, as a result, safety is increased, stability is increased and material fatigue is reduced. As a further result, comfort is improved, noise is reduced and, thus, acoustics inside the watercraft as well as outside the watercraft, especially in the water, is improved. Furthermore, wear and tear of the watercraft, in particular of the rotary system 120, 130, 140, is reduced.

Another aspect of the invention is a method, further comprising rotating said rotational element 300, 302, 304, 306 about the rotational axis 340, such that said thixotropic balancing substance 330 liquefies and distributes itself along the circumferential balancing area 320, and an imbalance of said rotational element 300, 302, 304, 306 is reduced.

Another aspect of the invention is a method, wherein said rotational axis 340 is oriented horizontally; or said rotational axis 340 is oriented vertically.

Another aspect of the invention is a method, wherein said rotational element 300, 302, 304, 306 is an original element of said rotary system 120, 130, 140. As a consequence, the chamber 310 may not require space of its own, and as a result, the chamber 310 may be easy to introduce into watercraft design.

Another aspect of the invention is a method, wherein said rotational element 300, 302, 304, 306 is a replacement element of said rotary system 120, 130, 140. As a consequence, the chamber 310 may not require space of its own, and as a result, the chamber 310 may be easy to introduce into watercraft design. As a further consequence, the rotational element 300, 302, 304, 306 may be compatible with the original rotational element, and as a result, the rotational element 300, 302, 304, 306 may be used for upgrading the watercraft.

Another aspect of the invention is a method, wherein said rotational element 300, 302, 304, 306 is a supplemental element to said rotary system 120, 130, 140. As a consequence, the rotational element 300, 302, 304, 306 may be compatible with the original rotational element, and as a result, the rotational element 300, 302, 304, 306 may be used for upgrading the watercraft.

Another aspect of the invention is a method, wherein said rotational element 300, 302, 304, 306 is a hollow shaft or tubular shaft; said rotational element 300, 302, 304, 306 is an articulated shaft, for example a cardan shaft.

Another aspect of the invention is a method, wherein said rotary system 120, 130, 140 is an engine system 120 of said watercraft; said rotational element 300, 302, 304, 306 is a crankshaft; or both.

Another aspect of the invention is a method, wherein said rotary system 120, 130, 140 is an power transmission system 130 of said watercraft, for example a powertrain or powerplant; said rotational element 300, 302, 304, 306 is a shaft 302, for example a driveshaft, such as a propeller driveshaft, a flywheel or a container; or a combination thereof.

Another aspect of the invention is a method, wherein said chamber 310 is annular or ring-shaped. As a consequence, the chamber 310 may allow, owing to a larger diameter, for an efficient use of the thixotropic balancing substance 330, and as a result, the amount of the thixotropic balancing substance 330 may be reduced. As a further consequence, owing to the cross section being rectangular, semicircle-shaped or bell-shaped, the thixotropic balancing substance 330 may operate most effective, and as a further result, the amount of the thixotropic balancing substance 330 may further be reduced. As a further consequence, owing to the cross section being circular, an air resistance may be reduced, and as a further result, stability may be improved.

Another aspect of the invention is a method, wherein said chamber 310 is cylindrical. As a consequence, the chamber 310 may be compact, and as a result, the chamber 310 may require little space.

Another aspect of the invention is a method, wherein said chamber 310 has a cross section being rectangular, square, semicircle-shaped, bell-shaped or circular.

Another aspect of the invention is a method, wherein said chamber 310 has a diameter of between approximately 0.01 m and approximately 1 m, or between approximately 0.02 m and approximately 0.5 m, or between approximately 0.05 m and approximately 0.2 m, or approximately 0.1 m; said chamber 310 has a length of between approximately 0.01 m and approximately 20 m, or between approximately 0.02 m and approximately 10 m, or between approximately 0.05 m and approximately 5 m, or between approximately 0.1 m and approximately 2 m, or approximately 0.5 m; or a combination thereof. However, the diameter, length or both may be determined by available space.

Another aspect of the invention is a method, wherein said amount of said thixotropic balancing substance 330 is between approximately 0.01 kg and approximately 1000 kg, or between approximately 0.1 kg and approximately 200 kg, or between approximately 0.2 kg and approximately 100 kg, or between approximately 0.5 kg and approximately 50 kg, or between approximately 1 kg and approximately 20 kg, or approximately 5 kg; said chamber 310 is filled with the amount of said thixotropic balancing substance 330 to between approximately 1% and approximately 90%, or between approximately 10% and approximately 80%, or between approximately 25% and approximately 75%, or approximately 50%; or a combination thereof.

Another aspect of the invention is a method, wherein said chamber 310 comprises a circumferential balancing area 320 with a nanostructure, said nanostructure being, for example, formed by a material, such as a varnish, comprising nanoparticles, or imprinted on said balancing area 320. The nanostructure may be provided by distributing, for example spraying and drying or hardening, the material on the balancing area. Drying or hardening may comprise curing nanomaterial, that is the nanovarnish, using ultra-violet (UV) radiation, that is UV light, for example. The material, that is the nanomaterial, may provide the nanostructure as nanosubstrate. The nanomaterial may comprise two or more components, for instance a first component A, for example a resin, and a second component B, for example a hardener. The nanomaterial may be a two-component material. The nanomaterial, that is the first component A and the second component B, may react by chemical crosslinking or polymerization. The chemical crosslinking reaction may start immediately or soon after mixing the first component A and the second component B. As a consequence, movability of the thixotropic balancing substance 330 on the balancing area 320 may increase, and as a result, the effect of balancing may be improved.

Another aspect of the invention is a method, wherein said rotational element 300, 302, 304, 306 comprises metal, for example steel or aluminum, or composite material, for example glass-fiber-reinforced material or carbon-fiber-reinforced material, or synthetic material, for example plastics or plexiglas. The material is preferably material used elsewhere in the watercraft, in particular in the rotary system 120, 130, 140. As a consequence, problems owing to incompatibility may be avoided, and as a result, life time of the watercraft, the rotary system 120, 130, 140 or both may be improved, and maintenance may be simplified.

Another aspect of the invention is a method, wherein said thixotropic balancing substance 330 has a yield stress value between approximately 1 Pa and approximately 400 Pa, for example between approximately 2 Pa and approximately 260 Pa, such as approximately 30 Pa. As a consequence, distribution of the thixotropic balancing substance 330 may be improved, and as a result, the effect of the balancing may be improved.

Another aspect of the invention is a method, wherein said thixotropic balancing substance 330 is a balancing gel composition comprising:
1) 85 to 97% by weight of a glycol ether component comprising one or more ethylene/propylene glycol copolymer ethers of the general formula (I) or the general (II) or mixtures thereof

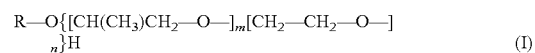 (I)

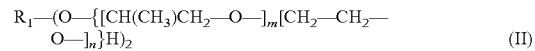 (II)

wherein
R is hydrogen or an alkyl group of 2-8 carbon atoms;
$R_1$ is an alkylene moiety of 2-8 carbon atoms in which the two substituents are not carried on the same carbon atom;
m is the mole percentage of propylene glycol in the ethylene/propylene glycol copolymer moiety or moieties; and
n is the mole percentage of ethylene glycol in the ethylene/propylene glycol copolymer moiety or moieties, wherein the ratio n:m is in the range from 35:65 to 80:20;
each glycol copolymer compound having a number average molecular weight in the range of 2000-10000; and
2) 3 to 15% by weight of a fumed silica gel former;
said balancing composition being visco-elastic and having a storage modulus (G') between 1500 Pa and 5000 Pa at 22° C., a loss modulus (G") smaller than the storage modulus up to a cross-over Frequency of 10-40 Hz, and a Critical Yield Stress exceeding 2 Pa.

Another aspect of the invention is a method, wherein the number average molecular weight of the glycol ether component(s) is/are in the range of 3000-10000.

Another aspect of the invention is a method, wherein the ratio n:m is in the range from 35:65 to 80:20, or in the range from 40:60 to 75:22, or in the range from 40:60 to 60:40, or 50:50.

Another aspect of the invention is a method, wherein the fumed silica gel former is a hydrophilic type fumed silica having a BET surface area of from 90 to 400 m²/g, preferably from 200 to 300 m²/g; or the fumed silica gel former is a hydrophobized type fumed silica having has a BET surface area of from 50 to 300 m²/g, preferably from 250 to 350 m²/g; or mixtures of such hydrophilic and hydrophobized type fumed silica gel formers.

Another aspect of the invention is a method, wherein the glycol ether component(s) exhibit(s) a Viscosity Grade determined according to ISO3448 of above 500, preferably in the range of 800-1200.

Another aspect of the invention is a method, wherein a weight body is in contact with said thixotropic balancing substance 330. As a consequence, the weight body may contribute to balancing of the rotary system 120, 130, and as a result, the effect of the balancing may be improved, and the amount of said thixotropic balancing substance 330 may be reduced.

Another aspect of the invention is a method, wherein said weight body has, defined by a body size of said weight body, a body surface and a body weight, such that said weight body overcomes adhesion between said body surface and said thixotropic balancing substance 330 when said thixotropic balancing substance 330 is subjected to said vibration and changes in an agitated state. As a consequence, the body size ensures movability of the weight body in the chamber 310 with the thixotropic balancing substance 330 therein, and as a result, the effect of the balancing may be improved.

Another aspect of the invention is a method, wherein said weight body preferably is a ball. The body size corresponds with a diameter of the ball. The diameter may be determined by a ratio between the body surface according to $A=4\pi r^2$ accounting for surface structure, i.e. roughness, and adhesion, and a body volume according to $V=4/3\pi r^3$ accounting for body density and body weight. For increasing radius r, the body volume, and therefore body, weight increases faster than the body surface. As a consequence, movability of the weight body in the chamber 310 may be increased, and as a result, the effect of the balancing may be improved.

Another aspect of the invention is a method, wherein said weight body comprises metal, for example steel, such as stainless steel. As a consequence, durability of the weight body in the chamber 310 may be improved, and as a result, maintenance work may be simplified and reduced.

A further aspect of the invention is an apparatus for reducing vibration in a rotary system 120, 130, 140 of a watercraft, for example a cargo ship 100, characterized by a rotational element 300, 302, 304, 306 comprising a chamber 310-312 having a fulcrum on a rotational axis 340 of said rotational element 300, 302, 304, 306, comprising a circumferential balancing area 320 and being partially filled with an amount of a thixotropic balancing substance 330.

Yet a further aspect of the invention is a rotary system 120, 130, 140 of a watercraft, for example a cargo ship 100, for reducing vibration in said rotary system 120, 130, 140, characterized by a rotational element 300, 302, 304, 306 comprising a chamber 310-312 having a fulcrum on a rotational axis 340 of said rotational element 300, 302, 304, 306, comprising a circumferential balancing area 320 and being partially filled with an amount of a thixotropic balancing substance 330.

BRIEF DESCRIPTION OF THE SEVERAL VIEWS OF THE DRAWING(S)

While the specification concludes with claims particularly pointing out and distinctly claiming that which is regarded as the invention, a more particular description of the invention will be rendered by reference to specific embodiments thereof, which are depicted in the appended drawings, in order to illustrate the manner in which embodiments of the invention are obtained. Understanding that these drawings depict only typical embodiments of the invention, that are not necessarily drawn to scale, and, therefore, are not to be considered limiting of its scope, embodiments will be described and explained with additional specificity and detail through use of the accompanying drawings in which:

FIG. 8 shows a cross-sectional view of a chamber in a rotational element according to yet another embodiment of the invention;

FIG. 9 shows a cross-sectional view of a chamber in a rotational element according to yet another embodiment of the invention; and FIG. 10 shows a cross-sectional view of a chamber in another rotational element according to yet another embodiment of the invention.

DETAILED DESCRIPTION OF THE INVENTION

Figure 1:
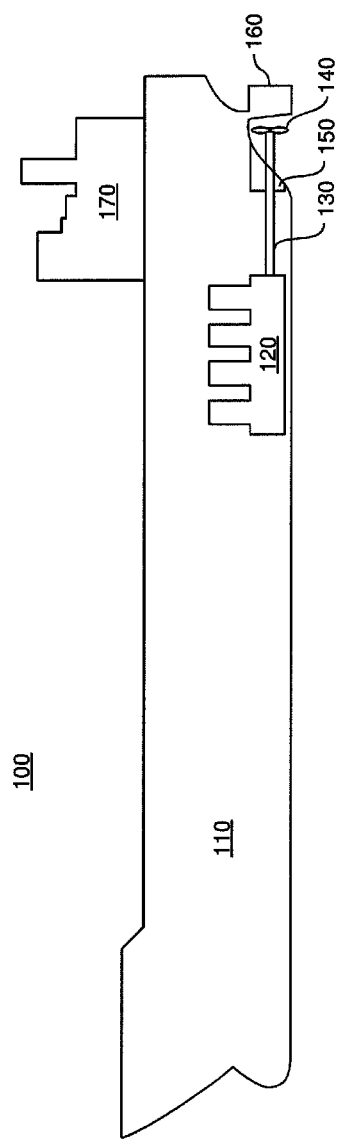
FIG. 1 shows a schematic view of a watercraft, for example a ship, such as a commercial ship, like a cargo ship, to which the invention may be applied.

In the following detailed description of the embodiments, reference is made to the accompanying drawings which form a part hereof and show, by way of illustration, specific embodiments in which the invention may be practiced. In the drawings, like numerals describe substantially similar components throughout the several views. The embodiments are intended to describe aspects of the invention in sufficient detail to enable those of skill in the art to practice the invention. Other embodiments may be utilized and structural, logical or electrical changes or combinations thereof may be made without departing from the scope of the invention. Moreover, it is to be understood, that the various embodiments of the invention, although different, are not necessarily mutually exclusive. For example, a particular feature, structure or characteristic described in one embodiment may be included within other embodiments. Furthermore, it is to be understood, that embodiments of the invention may be implemented using different technologies. Also, the term "exemplary" is merely meant as an example, rather than the best or optimal. The following detailed description is, therefore, not to be taken in a limiting sense, and the scope of the invention is defined only by the appended claims, along with the full scope of equivalents to which such claims are entitled.

Reference will be made to the drawings. In order to show the structures of the embodiments most clearly, the drawings included herein are diagrammatic representations of inventive articles. Thus, actual appearance of the fabricated structures may appear different while still incorporating essential structures of embodiments. Moreover, the drawings show only the structures necessary to understand the embodiments. Additional structures known in the art have not been included to maintain clarity of the drawings. It is also to be understood, that features and/or elements depicted herein are illustrated with particular dimensions relative to one another for purposes of simplicity and ease of understanding, and that actual dimensions may differ substantially from that illustrated herein.

In the following description and claims, the terms "include", "have", "with" or other variants thereof may be used. It is to be understood, that such terms are intended to be inclusive in a manner similar to the term "comprise".

In the following description and claims, the terms "coupled" and "connected", along with derivatives such as "communicatively coupled" may be used. It is to be understood, that these terms are not intended as synonyms for each other. Rather, in particular embodiments, "connected" may be used to indicate, that two or more elements are in direct physical or electrical contact with each other. However, "coupled" may also mean that two or more elements are not in direct contact with each other, but yet still co-operate or interact with each other.

In the following description and claims, terms, such as "upper", "lower", "first", "second", etc., may be only used for descriptive purposes and are not to be construed as limiting. The embodiments of a device or article described herein can be manufactured, used, or shipped in a number of positions and orientations.

Watercraft comprise vessels, for examples boats and ships. Generally, a boat is a vessel with up to 500 Gross Register Tonnage (GRT) or up to three masts with sails, and a ship is a vessel with over 500 GRT or more than three masts with sails. Vessels comprise naval vessels or navy vessels, for example warships and submarines, and civilian vessels, for example merchant vessels or commercial vessels, such as cargo vessels, like container vessels and tankers, and passenger vessels, like cruise vessels, fishing vessels and icebreakers, and private vessels. A passenger ship is a larger commercial vessel for transporting passengers. A cargo ship is a larger commercial vessel for transporting goods or materials. Watercraft may comprise a mechanical propulsion system, such as an engine or motor system or a power transmission system.

FIG. 1 shows a schematic view of a watercraft, for example a ship, such as a commercial ship, like a cargo ship 100, to which the invention may be applied. The cargo ship 100 comprises a hull 110, an engine or motor 120, a powertrain or powerplant 130, a propeller 140, a steering system 160, and a bridge 170. The cargo ship 100 comprises a bow section or fore section, a midship section, and an aft section or stern section. The cargo ship 100 may further comprise a seal 150, for example a stuffing box.

The engine or motor 120 is situated in the hull 110. In more detail, the engine 120 may be located in the aft section or stern section of the cargo ship 100 as shown in FIG. 1. The engine 120 generates power, such as rotational power, or energy, such as rotational energy, for propelling the cargo ship 100 and may be a combustion engine, for example a Diesel engine, such as a two-stroke diesel engine or a four-stroke Diesel engine of crosshead, trunk or opposed-piston construction, like a (slow-speed) two-stroke, crosshead diesel engine, or a petrol engine or gasoline engine, or a turbine, for example a gas turbine or steam turbine, or a steam engine, or an electrical engine, or a combination thereof, for example a hybrid engine, such as a diesel-electric engine). Accordingly, the engine 120 may consume wood, fossil fuel, for example coal, petrol, fuel oil, such as heavy fuel oil, or gas, such as liquefied natural gas (LNG), nuclear fuel, solar energy or electrical energy, such as stored electrical energy. Thus, the cargo ship 100 shown in FIG. 1 has a single engine 120. Alternatively, a watercraft may comprise a plurality of engines, for example two, three, four or more engines. Further, the engines may be of different types. For example, the watercraft may comprise a gas turbine for higher speeds or reduction of emissions in sensitive environments or ports, and a Diesel engine for cruising and cost efficiency.

The powertrain 130 is coupled to the engine 120 and the propeller 140 for communicating the power or energy from the engine 120 to the propeller 140. The powertrain 130 comprises a driveshaft, for example a propeller shaft. The propeller shaft passes in the seal 150, for example the stuffing box, through the hull 110. The propeller shaft couples the engine 120 to the propeller 140 and communicates the power from the engine 120 to the propeller 140. Thus, the engine 120 turns the propeller 140. The driveshaft, for example the propeller shaft, may be a hollow shafts or tubular shaft. The driveshaft, for example the propeller shaft, may be an articulated shaft, for example cardan shaft, comprising a cardan joint. The propeller 140 applies the power to water (not shown). The propeller 140 may be a twin, contra-rotating, controllable-pitch, or nozzle-style propeller. Thus, the cargo ship 100 shown in FIG. 1 has a single propeller 140. Alternatively, a watercraft may comprise a plurality of propellers, for example two, three, four or more propellers. The plurality of propellers may be powered by a plurality of engines, in any combination.

The engine 120 may comprise a rotational element, such as a crank shaft or an additional element, for example a container or vessel, that is a hollow container.

The powertrain 130 may further comprise a flywheel (not shown), such a dual-mass flywheel, for storing rotational power. The powertrain 130 may further comprise a gearbox (not shown) for converting speed and torque of the power. For a slow-speed engine, for example an engine with a maximum speed up to approximately 300 revolutions per minute (rpm), such as a slow-speed two-stroke Diesel engine with maximum a speed below approximately 120 rpm, like a slow-speed two-stroke crosshead Diesel engine with a maximum speed of approximately 80 rpm, the crankshaft may directly power the propeller. For a medium-speed engine, for example an engine with a maximum speed in the range from approximately 300 rpm to approximately 900 rpm, such as a medium-speed four-stroke Diesel engine with a maximum speed of approximately 500 rpm, or a high-speed engine, for example an engine with a maximum speed above approximately 900 rpm, the crankshaft may power the propeller via the gearbox.

The powertrain 130 may further comprise clutches for connecting and disconnecting engines of a plurality of engines.

The powertrain 130 may comprise a rotational element, such as the driveshaft, for example the propeller shaft, a flywheel, or a gearing wheel or an additional element, for example a container or vessel, that is hollow container.

The powertrain 130 may be arranged as z-drive. Alternatively, the engine 120 and the powertrain 130 may form an outboard engines or motor.

The propeller 140 may comprise a rotational element, such as a hub, boss or boss cap, or an additional element, for example a container or vessel, that is hollow container.

According to embodiments of the invention, one, two, three or more rotational elements 300 of the engine 120, powertrain 130 or both comprise one, two, three or more chambers 310-312 having a fulcrum on a rotational axis 340, comprising a circumferential balancing area 320 and being partially filled with an amount of a thixotropic balancing substance 330. The one, two, three or more rotational elements 300 comprising one, two, three or more chambers 310-312 may comprise metal, for example steel or aluminum, or composite material, for example glass-fiber-reinforced material or carbon-fiber-reinforced material, or synthetic material, for example plastics or plexiglas. The one, two, three or more rotational elements 300 comprising one, two, three or more chambers 310-312 may replace original rotational elements of the rotational system 120, 130. The one, two, three or more rotational elements 300 comprising one, two, three or more chambers 310-312 may supplement the rotational system 120, 130.

The chamber 310-312 may be caved into the rotational element 300. Alternatively, the chamber 310-312 may be situated in a hollow shaft or tubular shaft, and extend partially or fully, such as substantially fully, along the hollow shaft or tubular shaft.

The circumferential balancing area 320 may comprise a nanostructure for improving movability and flow of the thixotropic balancing substance 330, said nanostructure being, for example, formed by a material, such as a varnish, comprising nanoparticles, or imprinted on said circumferential balancing area 320.

Further, the invention may be applied to a real watercraft, such as a cargo ship in real life, as well as a scale watercraft, such as a model cargo ship.

Figure 2:
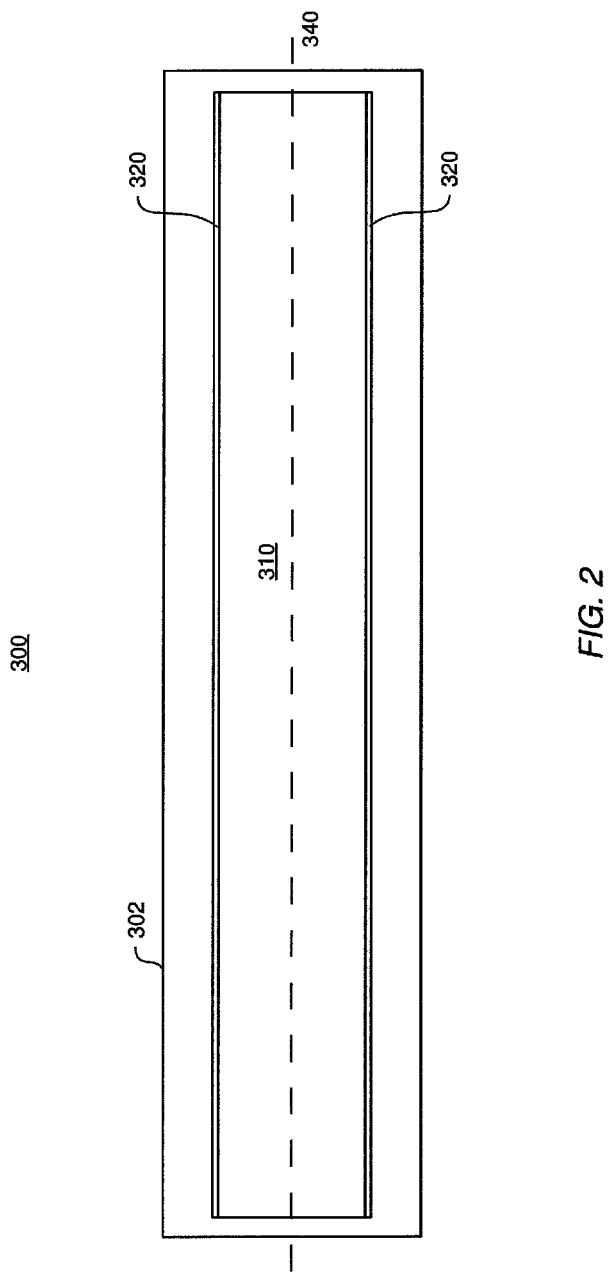
FIG. 2 shows a cross-sectional view of a chamber in a shaft, for example a driveshaft, such as a propeller shaft, according to an embodiment of the invention.

FIG. 2 shows a cross-sectional view of a chamber 310 in a shaft 302, for example a driveshaft, such as a propeller shaft, according to an embodiment of the invention. The chamber 310 is situated in a hollow shaft or tubular shaft, and extends substantially fully along the hollow shaft or tubular shaft. Ends of the hollow shaft or tubular shaft may be sealed or closed with lids. The shaft 302 is rotatable about a rotational axis 340. The chamber 310 comprises a circumferential balancing area 320. The shaft 302 may be an articulated shaft, for example a cardan shaft.

Figure 3:
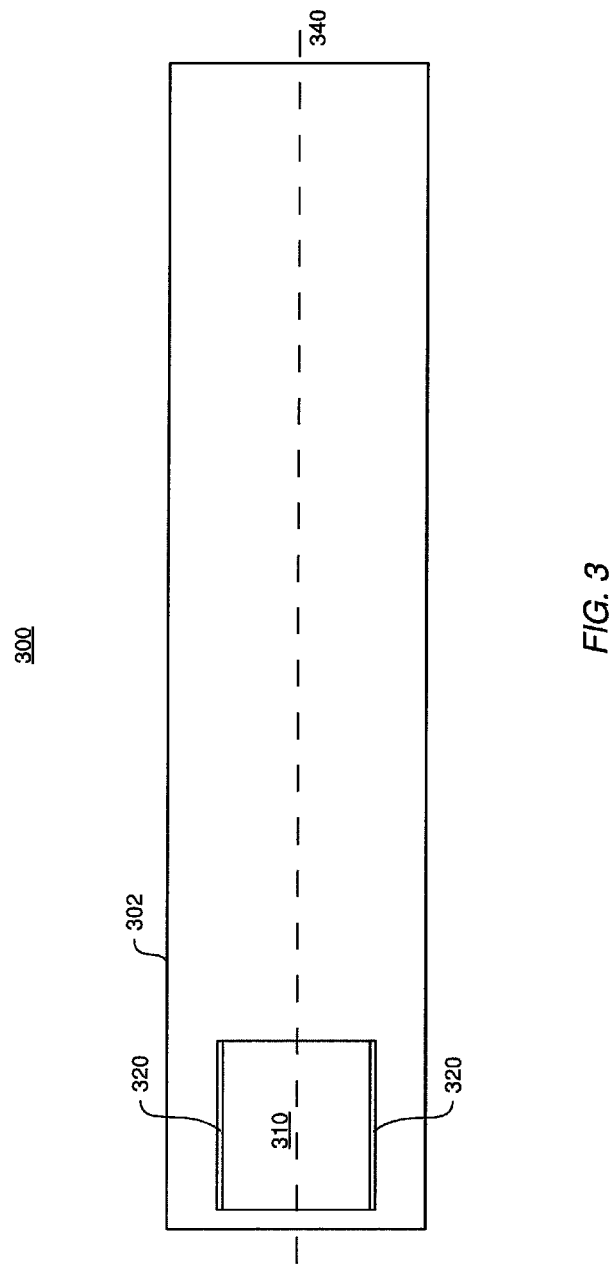
FIG. 3 shows a cross-sectional view of a chamber in a shaft, for example a driveshaft, such as a propeller shaft, according to another embodiment of the invention.

FIG. 3 shows a cross-sectional view of a chamber 310 in a shaft 302, for example a driveshaft, such as a propeller shaft, according to another embodiment of the invention. The chamber 310 is caved into the shaft 302, and extends partially along the shaft 302 in an end section of the shaft 302. The chamber 310 may be sealed or closed with a lid. The shaft 302 is rotatable about a rotational axis 340. The chamber 310 comprises a circumferential balancing area 320.

The chamber 310 may have a diameter of between approximately 0.01 m and approximately 1 m, or between approximately 0.02 m and approximately 0.5 m, or between approximately 0.05 m and approximately 0.2 m, or approximately 0.1 m.

The chamber 310 may have a length of between approximately 0.01 m and approximately 20 m, or between approximately 0.02 m and approximately 10 m, or between approximately 0.05 m and approximately 5 m, or between approximately 0.1 m and approximately 2 m, or approximately 0.5 m.

Figure 4:
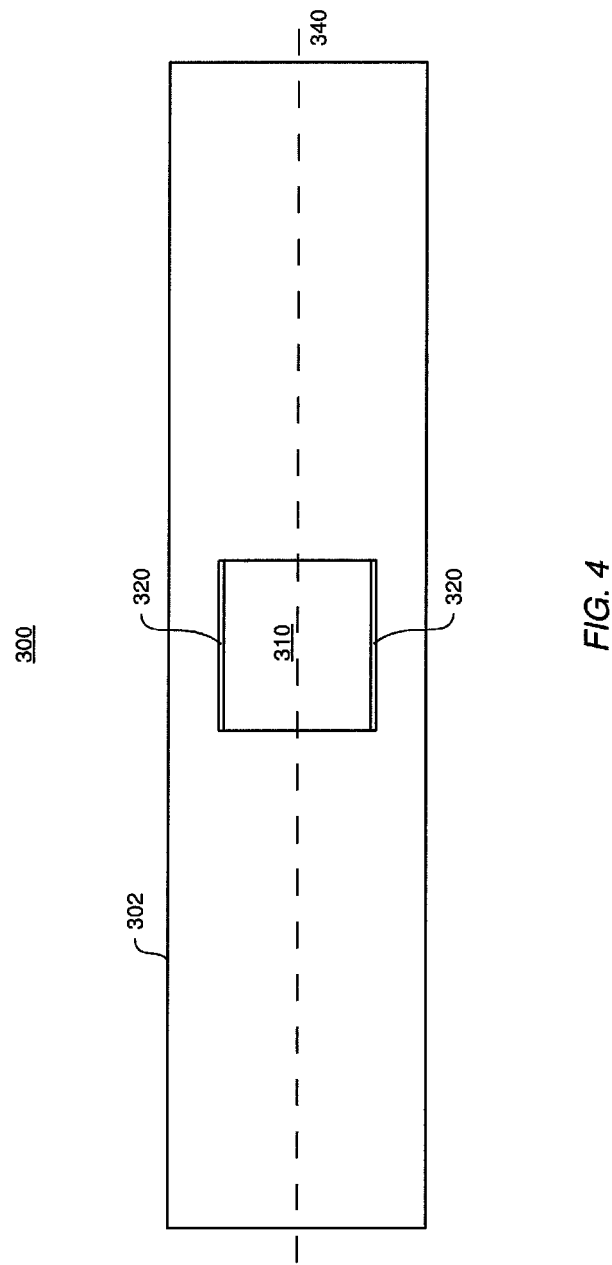
FIG. 4 shows a cross-sectional view of a chamber in a shaft, for example a driveshaft, such as a propeller shaft, according to yet another embodiment of the invention.

FIG. 4 shows a cross-sectional view of a chamber 310 in a shaft 302, for example a driveshaft, such as a propeller shaft, according to yet another embodiment of the invention. The chamber 310 is caved into the shaft 302, and extends partially along the shaft 302 in a mid section of the shaft 302. The chamber 310 may be sealed or closed with a lid. The shaft 302 is rotatable about a rotational axis 340. The chamber 310 comprises a circumferential balancing area 320.

Figure 5:
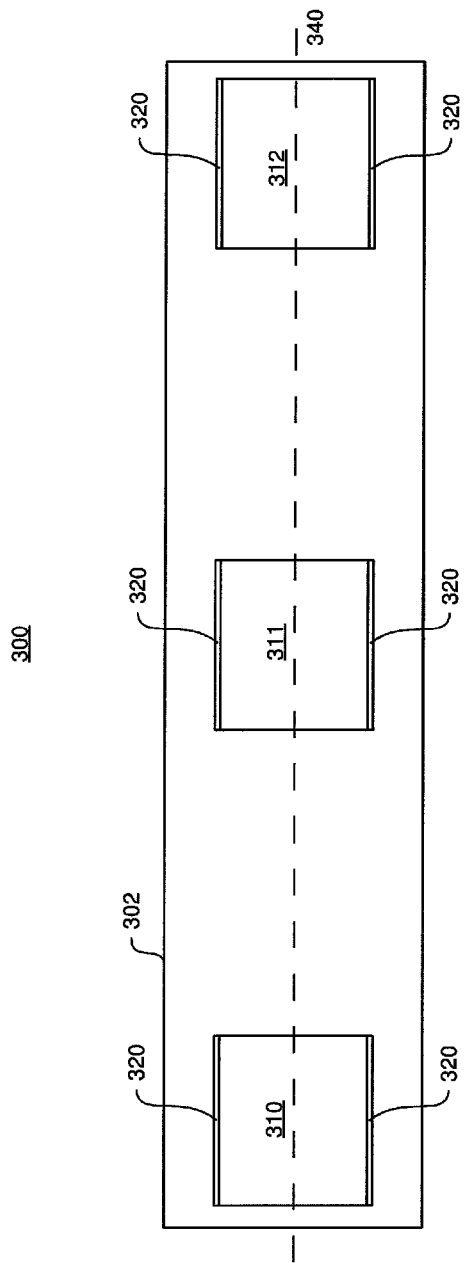
FIG. 5 shows a cross-sectional view of a plurality of chambers in a shaft, for example a driveshaft, such as a propeller shaft, according to yet another embodiment of the invention.

FIG. 5 shows a cross-sectional view of a plurality of chambers 310-312 in a shaft 302, for example a driveshaft, such as a propeller shaft, according to yet another embodiment of the invention. The chambers 310-312 are caved into the shaft 302, and extend partially along the shaft 302 at a plurality of locations along the shaft 302.

The thixotropic balancing substance 330 operates in the chamber 310-312. Owing to vibration, the thixotropic balancing substance 330 distributes itself along the circumferential balancing area 320, such that a center of gravity 350 moves towards the rotational axis 340 of the rotational element 300, such as the shaft 302, and the vibration is reduced or minimized or eliminated.

Figure 6:
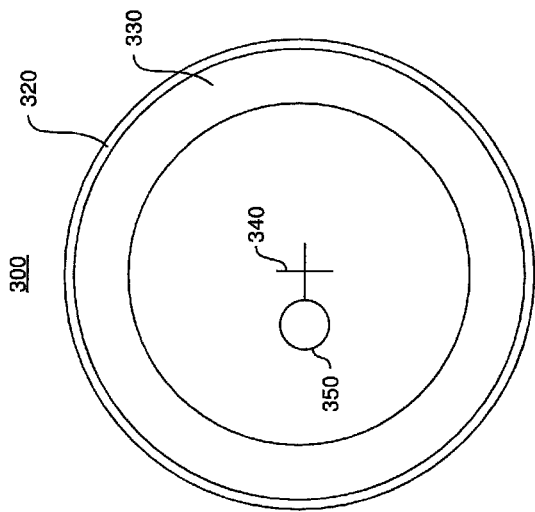
FIG. 6 shows, for a preferred embodiment of the invention, a cross-sectional view of the cylindrical chamber at an initial point in time.

FIG. 6 shows, for a preferred embodiment of the invention, a cross-sectional view of the cylindrical chamber 310 at an initial point in time, when the thixotropic balancing substance 330 partially fills the chamber 310. The thixotropic balancing substance 330 may be evenly distributed along the circumferential balancing area 320 as shown in FIG. 6. For a vertical rotational axis 340, the thixotropic balancing substance 330 may partially fill the chamber 310 to an even level perpendicular to the rotational axis 340. For a horizontal rotational axis 340, the thixotropic balancing substance 330 may partially fill the chamber 310 to an even level along the rotational axis 340. Owing to an imbalance of the rotational element 300, a CofG 350 is offset from the rotational axis 340.

Figure 7:
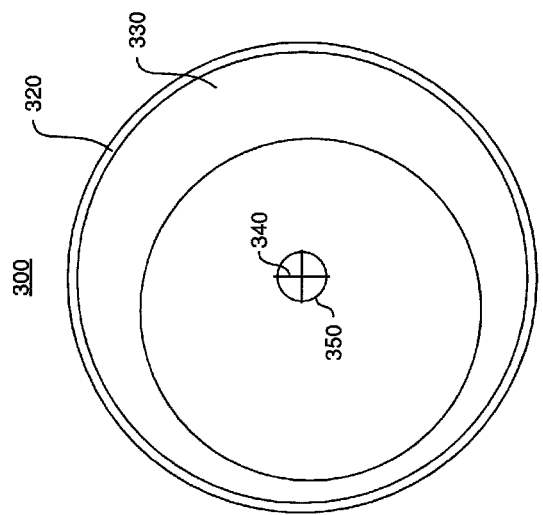
FIG. 7 shows, for the preferred embodiment of the invention, a cross-sectional view of the cylindrical chamber at a point in time, when the thixotropic balancing substance is distributed along the circumferential balancing area of the chamber.

FIG. 7 shows, for the preferred embodiment of the invention, a cross-sectional view of the cylindrical chamber 310 at a point in time, when the thixotropic balancing substance 330 is distributed along the circumferential balancing area 320 of the chamber 310, such that the vibration is reduced. As the rotational element 300 rotates about the rotational axis 340, the thixotropic balancing substance 330 liquefies owing to vibration in the rotary system 120, 130 and distributes along the circumferential balancing area 320 of the chamber 310, such that an imbalance of the rotational element 300 is reduced, and, thus, the vibration is reduced. The CofG 350 moves towards the rotational axis 340. When the vibration is reduced, the thixotropic balancing substance 330 may solidify and maintain its position and distribution on the circumferential balancing area 320.

The amount of said thixotropic balancing substance 330 may be between approximately 0.01 kg and approximately 1000 kg, or between approximately 0.1 kg and approximately 200 kg, or between approximately 0.2 kg and approximately 100 kg, or between approximately 0.5 kg and approximately 50 kg, or between approximately 1 kg and approximately 20 kg, or approximately 5 kg. The chamber 310 may be filled with the amount of said thixotropic balancing substance 330 to between approximately 1% and approximately 90%, or between approximately 10% and approximately 80%, or between approximately 25% and approximately 75%, or approximately 50%.

FIG. 8 shows a cross-sectional view of a chamber 310 in a rotational element 300, 304 according to yet another embodiment of the invention. The chamber 310 is caved into the rotational element 300, 304, such as a flywheel, a gearing wheel or an additional element, for example a container or vessel. The chamber 310 is annular or ring-shaped. The chamber 310 may have a cross section being rectangular, square (not shown), semicircle-shaped (not shown), bell-shaped (not shown), circular (not shown) or the like.

FIG. 9 shows a cross-sectional view of a chamber in a rotational element 300, 304 according to yet another embodiment of the invention. With reference to FIG. 8, the rotational element 300, 304 comprises a center hole 360. The center hole 360 may be circular, square (not shown), hexagonal (not shown) or the like. The center hole 360 of the rotational element 300, 304 may receive a shaft, for example a driveshaft, such as a propeller shaft, for coupling the rotational element 300, 304 to the rotational system 120, 130, 140.

FIG. 10 shows a cross-sectional view of a chamber 310 in another rotational element 300, 306 according to yet another embodiment of the invention. The chamber 310 is caved into the other rotational element 300, 306, such as a flywheel, a gearing wheel or an additional element, for example a container or vessel. The chamber 310 is cylindrical. The chamber 310 may have a cross section being rectangular, square (not shown), semicircle-shaped (not shown), bell-shaped (not shown), circular (not shown) or the like.

The thixotropic balancing substance 330 may be a thixotropic tire balancing composition disclosed in EP patent application 0 281 252 and corresponding U.S. Pat. No. 4,867,792, having a yield stress value between 1 Pa and 260 Pa being capable of balancing tires by being able to flow under the influence of the vibrations induced when a heavy spot on the tire hits the road surface. Alternatively, the thixotropic balancing substance may have a yield stress value greater than 2 Pa. However, owing to the lower yield stress value, a lower rotational acceleration may be necessary, especially if the rotational element is not in a vertical position.

Rheological properties of a balancing substance are its Critical Yield Stress (CYS) and Elastic (Storage) Modulus (G'), both measured in the linear visco-elastic region, as well as its Yield Stress as determined in stress growth measurements and the relationship between its storage modulus (G') and its loss modulus (G"), measured by a frequency sweep.

Storage modulus (G') is a measure of the strength of the substance, that is the strength and the number of bonds between the molecules of the gel former.

Loss modulus (G") is a measure of a substance's ability to dissipate energy in the form of heat.

The relationship between G' and G" as measured in a frequency sweep is a structural characterization of a substance. The cross-over frequency is the frequency at which G" becomes greater than G'.

Of equal importance as the visco-elastic properties is a long term stability of the balancing substance in service, the performance at various temperatures of the substance, and the chemical inertness of the substance.

A balancing substance should remain functional during the life time of the balancing system and under the various conditions, in particular within a temperature range from approximately −50° C. or −30° C. to +90° C.

Furthermore, the balancing substance must not have any harmful effect on the balancing system and environment and should be disposable or recyclable.

In more detail, the thixotropic balancing substance may be a balancing gel comprising two components, namely, a base liquid and a gel former, and preferably fulfilling minimum criteria comprising, the regard to rheology, a storage modulus (G') between approximately 100 Pa and approximately 5000 Pa, a cross-over frequency (G">G') between approximately 1 Hz and approximately 40 Hz and a critical yield stress value greater than approximately 1 Pa; with regard to volatility, an evaporation loss of less than approximately 6% by weight after 10 hours at 99° C.; a pour point of the base liquid lower than approximately −15° C. according to the Standard Test Method for Pour Point of Petroleum Products, ASTM D97; with regard to separation stability, a separation of the base liquid of less than approximately 20% by weight after 12 hours at 300 000×g and 25° C.; and, with regard to chemical reactivity, substantial inertness, such as non-corrosiveness to metals and no effect on polymers, such as rubber. The balancing gel typically comprises, by weight, between approximately 75% and approximately 99%, for example between approximately 85% and approximately 97%, such as approximately 95% of the base liquid, and, correspondingly, between approximately 1% and approximately 25%, for example between approximately 3% and approximately 15%, such as approximately 5% of the gel former. The balancing gel may further comprise, preferably in minor amounts, a corrosion inhibitor, an anti-oxidant, a dye or a combination thereof.

The base liquid may, for example, comprise a polyalkylene glycol (PAG), such as a polypropylene glycol (PPG) or a polyethylene glycol (PEG); a combination, that is a mixture, of PAGs, such as a combination of a PPG and a PEG; a copolymer of ethylene oxide and propylene oxide; or a combination thereof.

The base liquid may comprise an alcohol-(ROH-)started polymer of oxypropylene groups having a generalized formula:

$$RO-[CH(CH_3)CH_2-O-]_mH, \quad (1)$$

where R is hydrogen or an alkyl group, having one terminal hydroxyl group and being water-insoluble, such as products with a variety of molecular weights and viscosities marketed by DOW Chemical Company under the trademark UCON LB Fluids™.

The base liquid may, alternatively or additionally, comprise an alcohol-(ROH-)started linear random copolymer of ethylene oxide and propylene oxide having a generalized formula:

$$RO-[CH(CH_3)CH_2-O-]_m[CH_2-CH_2-O-]_nH, \quad (2)$$

where R is hydrogen or an alkyl group.

The base liquid may, alternatively or additionally, comprise an alcohol-(ROH-)started random copolymer of ethylene oxide and propylene oxide preferably comprising approximately equal amounts, that is approximately 50%, by weight of oxyethylene groups and oxypropylene groups, having one terminal hydroxyl group and being water-soluble at ambient temperature, that is at temperatures below approximately 40° C., such as products with equal amounts by weight of oxyethylene groups and oxypropylene groups and with a variety of molecular weights and viscosities marketed by DOW Chemical Company under the trademark UCON 50-HB Fluids™. For example, the base liquid may, alternatively or additionally, comprise a butanol-started random copolymer of ethylene oxide and propylene oxide comprising equal amounts by weight of oxyethylene groups and oxypropylene groups with a numbered average molecular weight of 3930, a viscosity of approximately 1020 cSt at 40° C. and a viscosity grade of approximately 1000 according to ISO 3448, such as a product marketed by DOW Chemical Company under the trademark UCON 50-HB-5100™.

The base liquid may, alternatively or additionally, comprise a diol-started random copolymer of ethylene oxide and propylene oxide preferably comprising approximately 75% by weight oxyethylene groups and, correspondingly, approximately 25% by weight oxypropylene groups, having two terminal hydroxyl groups (R=H) and being water-soluble at temperatures below approximately 75° C., such as products with a variety of molecular weights and viscosities marketed by DOW Chemical Company under the trademark UCON 75-H Fluids™. For example, the base liquid may, alternatively or additionally, comprise a diol-started random copolymer of ethylene oxide and propylene oxide comprising 75% by weight oxyethylene groups and 25% by weight oxypropylene groups with a numbered average molecular weight of 6950 and a viscosity of approximately 1800 cSt at 40° C., such as a product marketed by DOW Chemical Company under the trademark UCON 75-H-9500™.

The base liquid may, alternatively or additionally, comprise an alcohol-(ROH-)started random copolymer of ethylene oxide and propylene oxide preferably comprising approximately 40% by weight of oxyethylene groups and, correspondingly, approximately 60% by weight oxypropylene groups and being water-soluble, such as products with a variety of molecular weights and viscosities marketed by DOW Chemical Company under the trademark SYNALOX 40™. For example, the base liquid may, alternatively or additionally, comprise an alcohol-started random copolymer of ethylene oxide and propylene oxide comprising 40% by weight of oxyethylene groups and 60% by weight oxypropylene groups with a numbered average molecular weight of 5300, a viscosity of 1050 cSt at 40° C. and a viscosity grade of approximately 1000 according to ISO 3448 such as a product marketed by DOW Chemical Company under the trademark SYNALOX 40-D700™.

The base liquid may, alternatively or additionally, comprise a diol-started random copolymer of ethylene oxide and propylene oxide preferably comprising approximately 50% by weight of oxyethylene and, correspondingly, approximately 50% by weight oxypropylene groups with a kinematic viscosity of 960-1160 cSt (or mm²/s) at 40° C. ASTM D445 such as a product marketed by DOW Chemical Company under the trademark SYNALOX 50-D700™.

The gel former may comprise fumed silica, for example hydrophobic silica or hydrophilic silica, preferably having a BET (Brunauer, Emmett, Teller) surface between approximately 50 m²/g and approximately 400 m²/g, for example a hydrophilic fumed silica having a BET surface of 300 m²/g, such as a product marketed by Evonik Industries under the trademark Aerosil A300™.

The gelling effect of the gel formers on the oils is accomplished by the formation of a network of the molecules of the gel former through hydrogen bonding via hydroxy groups or via van der Waals attraction between segments molecules of the gel former. The number and the strength of these bonds determines the gel strength, and the ability of the gel to support a load (critical yield stress).

The thixotropic balancing substance may be a balancing gel comprising a balancing gel composition comprising:
1) 85 to 97% by weight of a glycol ether component comprising one or more ethylene/propylene glycol copolymer ethers of the general formula (I) or the general (II) or mixtures thereof

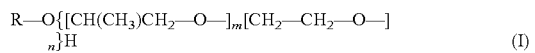

(I)

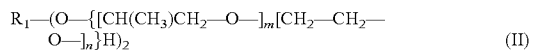

(II)

wherein R is hydrogen or an alkyl group of 2-8 carbon atoms; $R_1$ is an alkylene moiety of 2-8 carbon atoms in which the two substituents are not carried on the same carbon atom; m is the mole percentage of propylene glycol in the ethylene/propylene glycol copolymer moiety or moieties; and n is the mole percentage of ethylene glycol in the ethylene/propylene glycol copolymer moiety or moieties, wherein the ratio n:m is in the range from 35:65 to 80:20; each glycol copolymer compound having a number average molecular weight in the range of 2000-10000; and 2) 3 to 15% by weight of a fumed silica gel former; said balancing composition being visco-elastic and having a storage modulus (G') between 1500 Pa and 5000 Pa at 22° C., a loss modulus (G") smaller than the storage modulus up to a cross-over frequency of 10-40 Hz, and a Critical Yield Stress exceeding 2 Pa.

The number average molecular weight of the glycol ether component(s) may be in the range of 3000-10000. The ratio n:m may be in the range from 35:65 to 80:20, preferably in the range from 40:60 to 75:22, in particular from 40:60 to 60:40, such as 50:50. The fumed silica gel former may be a hydrophilic type fumed silica having a BET surface area of from 90 to 400 m²/g, preferably from 200 to 300 m²/g; or the fumed silica gel former is a hydrophobized type fumed silica having has a BET surface area of from 50 to 300 m²/g, preferably from 250 to 350 m²/g; or mixtures of such hydrophilic and hydrophobized type fumed silica gel formers. The glycol ether component(s) may exhibit a Viscosity Grade determined according to ISO3448 of above 500, preferably in the range of 800-1200.

The compositions of the invention are typically made by mixing together the ingredients, if necessary under slight heating to below approximately 40° C.

Using base liquids and gel formers as described above, a series of exemplary balancing substances have been prepared. The compositions are shown in Table 1.

TABLE 1

Balancing Substance Formulations (in % by weight)

| Composition # | Aerosil A300 | UCON 75-HB-9500 | UCON 50-HB-5100 | SYNALOX D50-700 |
|---|---|---|---|---|
| 1 | 4 | 0 | 96 | 0 |
| 2 | 4 | 0.5 | 95.5 | 0 |
| 3 | 4 | 0 | 0 | 96 |
| 4 | 4 | 0.5 | 0 | 95.5 |
| 5 | 5 | 0 | 95 | 0 |
| 6 | 5 | 0.5 | 94.5 | 0 |
| 7 | 5 | 0 | 0 | 95 |
| 8 | 5 | 0.5 | 0 | 94.5 |
| 9 | 6 | 0 | 94 | 0 |
| 10 | 6 | 0.5 | 93.5 | 0 |
| 11 | 6 | 0 | 0 | 94 |
| 12 | 6 | 0.5 | 0 | 93.5 |

The chamber 310 may further comprise a weight body (not shown) being in contact with the thixotropic balancing substance 330 and contributing to balancing of the rotary system 120, 130. The weight body has, defined by a body size of the weight body, a body surface and a body weight, such that the weight body overcomes adhesion between the body surface and the thixotropic balancing substance 330 when the thixotropic balancing substance 330 is subjected to the vibration and changes into an agitated state. The body size ensures movability of the weight body in the chamber 310 with the thixotropic balancing substance 330 therein. The weight body may be a ball. The body size corresponds with a diameter of the ball. The diameter may be determined by a ratio between the body surface according to:

$$A = 4 pi\ r^2,$$ (3)

where r is a radius of the ball, accounting for surface structure, i.e. roughness, and adhesion, and a body volume according to:

$$V=4/3 pi\ r^3, \qquad (4)$$

where r is a radius of the ball, accounting for body density and body weight. For increasing radius r, the volume, and therefore body weight, increases faster than the body surface, and movability of the weight body in the chamber 310 increases. The weight body may comprise metal, for example steel, such as stainless steel.

Embodiments of the inventions comprise a corresponding apparatus, that may carry out the method.

Embodiments of the inventions comprise a corresponding system, that may carry out the method, possibly across a number of devices.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention is, therefore, to be determined with reference to the appended claims, along with the full scope of equivalents to which such claims are entitled.

The invention claimed is:

1. A method of reducing vibration in a mechanical propulsion system for watercraft comprising:
   providing a watercraft mechanical propulsion system comprising an engine, a powertrain or power plant, and a propeller, wherein at least one of the engine, the powertrain or power plant, and the propeller is a rotary system comprising a rotational element having a rotational axis having a first end along the rotational axis and a second end along the rotational axis distal from the first end and comprising a chamber having a fulcrum on a rotational axis of said rotational element comprising a circumferential balancing area and being more than approximately 1% and less than approximately 90% filled with a thixotropic balancing substance, wherein the thixotropic balancing substance is capable of reducing a vibration caused by an imbalance of the rotational element during rotation of the rotational element by flowing and distributing itself along the circumferential balancing area in response to a vibration to reduce the imbalance,
   rotating the rotational element about the rotational axis with power from the engine, powertrain or power plant, and
   exposing the rotating rotational element to a vibration condition caused by an imbalance of the rotational element during rotation of the rotational element, whereby the thixotropic balancing substance responds to the condition by flowing and distributing itself along the circumferential area to reduce the imbalance.

2. The method of claim 1, wherein
   said thixotropic balancing substance is initially in a gelled state and liquefies in response to a vibration caused by an imbalance of said rotational element, whereby the imbalance of said rotational element is reduced.

3. The method of claim 1, wherein:
   said rotational axis is oriented horizontally; or
   said rotational axis is oriented vertically.

4. The method of claim 1, wherein:
   (a) said rotational element is an original element of said rotary system, a replacement element of said rotary system, or a supplemental element to said rotary system;
   (b) said rotational element is a hollow shaft or tubular shaft; or
   (c) a combination of (a) and (b).

5. The method of claim 1, wherein:
   said rotary system is an engine system of said watercraft; or said rotational element is a crankshaft; or
   both.

6. The method of claim 1, wherein:
   (a) said rotary system is a power transmission system of said watercraft; or
   (b) said rotational element is a shaft; or
   (c) a combination of (a) and (b) above.

7. The method of claim 1, wherein:
   (a) said chamber has a cross section being rectangular, square, semicircle-shaped, bell-shaped or circular or
   (b) said chamber is annular or ring-shaped, or cylindrical and has a diameter of between approximately 0.01 m and approximately 1 m; or
   (c) said chamber has a length of between approximately 0.01 m and approximately 20 m; or
   (d) a combination of two or more of (a), (b) and (c) above.

8. The method of claim 1, wherein:
   (a) said amount of said thixotropic balancing substance is between approximately 0.01 kg and approximately 1000 kg; and
   (b) more than approximately 10% and less than approximately 80% of said chamber is filled with said thixotropic balancing substance.

9. A rotary system for a watercraft mechanical propulsion system selected from:
   an engine,
   a powertrain or power plant for transferring power between an engine and a propeller, and
   a propeller,
   wherein the rotary system comprises a rotational element, wherein the rotational element has a rotational axis having a first end along the rotational axis and a second end along the rotational axis distal from the first end and
   comprises a chamber having a fulcrum on the rotational axis of said rotational element, comprising a circumferential balancing area, wherein more than approximately 1% and less than approximately 90% of the chamber is filled with a solid thixotropic balancing substance, wherein the solid thixotropic balancing substance is capable of liquefying in response to vibration caused by an imbalanced condition of the rotary element during rotation of the rotational element.

10. The rotary system of claim 9, wherein:
   (a) the at least one chamber is located proximal to the first end of the rotational element and distal from the second end of the rotational element;
   (b) the rotational element comprises more than one of the chamber at spaced apart locations along the rotational axis; or
   (c) a combination of (a) and (b) above.

11. The rotary system of claim 9, wherein said amount of said thixotropic balancing substance is in the range from 0.5 kg to 1000 kg.

12. The rotary system of claim 9, wherein said amount of said thixotropic balancing substance is in the range from 1 kg to 1000 kg.

13. The rotary system of claim 9, wherein:
said rotary system is an engine system for a watercraft; or
said rotational element is a crankshaft; or
both.

14. The rotary system of claim 9, wherein:
(a) said rotary system is a power transmission system for a watercraft; or
(b) said rotational element is a shaft; or
(c) a combination of (a) and (b) above.

15. The rotary system of claim 9, wherein the thixotropic balancing substance comprises a base liquid and a gel former, wherein the base liquid comprises a polyalkylene glycol.

16. The rotary system of claim 9, wherein the thixotropic balancing substance comprises:
(1) 85 to 97% by weight of a glycol ether component comprising one or more ethylene/propylene glycol copolymer ethers of the general formula (I) or the general formula (II) or mixtures thereof

$$R\text{—}O\{[CH(CH_3)CH_2\text{—}O\text{—}]_m[CH_2CH_2\text{—}O\text{—}]_n\}H \qquad (I)$$

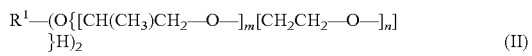

$$R^1\text{—}(O\{[CH(CH_3)CH_2\text{—}O\text{—}]_m[CH_2CH_2\text{—}O\text{—}]_n\}H)_2 \qquad (II)$$

wherein
R is selected from the group consisting of hydrogen and an alkyl group having 2 to 8 carbon atoms;
R1 is an alkylene moiety having 2 to 8 carbon atoms in which the two substituents are not bonded to the same carbon atom;
m is the mole percentage of propoxy moiety in the copolymer; and
n is the mole percentage of ethoxy moiety in the copolymer, wherein the ratio n:m is in the range from 35:65 to 80:20,
wherein the ethylene/propylene glycol copolymer ethers of formula (I) and formula (II) each have a number average molecular weight in the range from 2,000 to 10,000 and
(2) 3 to 15% by weight of a fumed silica.

17. The rotary system of claim 16, wherein the thixotropic balancing substance has a storage modulus (C) between 1500 Pa and 5000 Pa at 22° C., a loss modulus (G″) smaller than the storage modulus up to a cross-over Frequency of 10-40 Hz, and a Critical Yield Stress exceeding 2 Pa.

18. The rotary system of claim 9, wherein said chamber is filled with more than approximately 10% and less than approximately 80% with said thixotropic balancing substance.

* * * * *